United States Patent
Pelton et al.

(10) Patent No.: US 6,952,710 B2
(45) Date of Patent: *Oct. 4, 2005

(54) APPARATUS, METHODS AND COMPUTER PROGRAM PRODUCTS FOR PERFORMING HIGH SPEED DIVISION CALCULATIONS

(75) Inventors: Walter Eugene Pelton, 3854 Lancelot Ct., Fremont, CA (US) 94536; K. Walt Herridge, San Jose, CA (US)

(73) Assignee: Walter Eugene Pelton, Fremont, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 09/878,850

(22) Filed: Jun. 11, 2001

(65) Prior Publication Data

US 2002/0016808 A1 Feb. 7, 2002

Related U.S. Application Data

(60) Provisional application No. 60/210,372, filed on Jun. 9, 2000.

(51) Int. Cl.[7] .................................................. G06F 7/52
(52) U.S. Cl. ...................................... 708/502; 708/654
(58) Field of Search ................................ 708/500, 502, 708/653, 654

(56) References Cited

U.S. PATENT DOCUMENTS

| | | |
|---|---|---|
| 3,746,848 A | 7/1973 | Clary |
| 3,803,393 A | 4/1974 | Wang |
| 4,023,028 A | 5/1977 | Dillard |
| 4,225,937 A | 9/1980 | Perreault et al. |
| 4,581,715 A | 4/1986 | Hyatt |
| 4,868,776 A | 9/1989 | Gray et al. |
| 4,929,954 A | 5/1990 | Elleaume |
| 5,007,009 A | 4/1991 | Azetsu |

(Continued)

FOREIGN PATENT DOCUMENTS

| | | |
|---|---|---|
| EP | 0 075 745 A2 | 4/1983 |
| EP | 0 080 266 A2 | 6/1983 |
| EP | 0 372 566 A2 | 6/1990 |
| EP | 0 441 121 A2 | 8/1991 |
| WO | WO 99/63451 A1 | 12/1999 |
| WO | WO 00/67146 A1 | 11/2000 |

OTHER PUBLICATIONS

*On the Real Time Computation of DFT and DCT Through Systolic Architectures*, N. Rama Murthy et al., IEEE Transactions on Signal Processing, vol. 42, No. 4, Apr. 1994, pp. 988–991.

(Continued)

*Primary Examiner*—Chuong D Ngo
(74) *Attorney, Agent, or Firm*—Alston & Bird LLP

(57) ABSTRACT

The present invention provides apparatus, methods, and computer program products for non-iterative division and non-iterative reciprocal generation. In one embodiment, the present invention uses a logic network that determines the bits of the quotient of a divisor and dividend by using a non-iterative, (i.e., non trial and error), method. Further, in another embodiment, the present invention may determine the reciprocal of a number M by separating the number M into at least two numbers X, Y . . . Z so that M=X+Y+ . . . +Z. The reciprocal of M is computed according to an equation 1/M=F(X,Y . . . Z) or an approximation 1/M≈G (X,Y . . . Z), where the approximation gives the correct value of the inverse of M to a predetermined accuracy. In some embodiments, the apparatus uses an equation that exactly describes the reciprocal or instead, it may include one or more memories for storing look-up tables containing pre-calculated parts of the equation.

9 Claims, 6 Drawing Sheets

U.S. PATENT DOCUMENTS

| | | | |
|---|---|---|---|
| 5,012,438 A | * | 4/1991 | Yamaguchi ............... 708/654 |
| 5,233,551 A | | 8/1993 | White |
| 5,245,564 A | | 9/1993 | Quek et al. |
| 5,504,690 A | | 4/1996 | Kageyama et al. |
| 5,515,308 A | | 5/1996 | Karp et al. |
| 5,563,818 A | | 10/1996 | Agarwal et al. |
| 5,784,307 A | | 7/1998 | Sheaffer |
| 5,818,745 A | | 10/1998 | Sheaffer |
| 5,847,977 A | | 12/1998 | Jhung |
| 6,038,579 A | | 3/2000 | Sekine |
| 6,127,863 A | | 10/2000 | Elliott |
| 6,240,338 B1 | | 5/2001 | Peterson |
| 6,240,433 B1 | | 5/2001 | Schmookler et al. |
| 6,263,257 B1 | | 7/2001 | Aemmer |
| 6,304,887 B1 | | 10/2001 | Ju et al. |
| 6,434,583 B1 | | 8/2002 | Dapper et al. |
| 6,496,795 B1 | | 12/2002 | Malvar |
| 6,735,610 B1 | | 5/2004 | Pelton |

OTHER PUBLICATIONS

*A Review of the Discrete Fourier Transform*, Part 1: *Manipulating the Powers of Two*, G. M. Blair, Electronics and Communication Engineering Journal, Institute of Electrical Engineers, London, vol. 7, No. 4, Aug. 1, 1995, pp. 169–177.

*Theory and Application of Digital Signal Processing*, L. R. Rabiner et al., Prentice–Hall, Inc., New Jersey, 1975, pp. 50–56 and 594–603; XP002141966.

*A Comparative Review of Real and Complex Fourier-Related Transforms*, O. K. Ersoy, Proceedings of the IEEE, US, IEEE, New York, vol. 82, No. 3, Mar. 1994, pp. 429–447.

*Numerical Methods*, Numerical Methods, XX, XX, G. Dahlquist et al., 1974, pp. 14–19, XP002116162.

* cited by examiner

APPARATUS, METHODS AND COMPUTER PROGRAM PRODUCTS FOR PERFORMING HIGH SPEED DIVISION CALCULATIONS

CROSS-REFERENCE TO RELATED APPLICATIONS

The present application claims priority from U.S. Provisional Patent Application Ser. No. 60/210,372, entitled: METHODS AND APPARATUS FOR HIGH SPEED DIVISION, filed on Jun. 9, 2000, the contents of which are incorporated herein by reference.

FIELD OF THE INVENTION

The present invention relates generally to apparatus and methods for performing mathematical calculations, and more particularly, for performing division calculations in electronic devices.

BACKGROUND OF THE INVENTION

The divide function is one of evaluating how many times a given value can be added to itself to become equal to another. The fact that some values do not add an integral number of times to equal a specific value does not alter the concept. In general, the quotient of two values has a certain value irrespective of the system of units in which the quotient is expressed. Similarly, if a number is expressed in a certain radix system (such as Binary) and the number is then represented as a left-justified number times a power of the radix, there is no change in the generality of that number. This is a typical format for representing numbers in a computing system.

In many convention systems, division is achieved by a clocked sequence of steps. This is particularly intuitive because the steps are similar to how school children are taught to divide. The process is iterative meaning that the division is performed through trial and error. A specific structure tries to subtract the divisor from the dividend and reports its success or failure to a register that accumulates the quotient. Such an iterative system may take many steps to divide high precision numbers.

Additionally, many conventional systems use iterative approximation algorithms for division operations, and for other special mathematical functions, such as the square root, reciprocal square root, and reciprocal functions. Newton-Raphson iterative algorithms are used in many cases since they are often faster than other algorithms. Nevertheless, iterative algorithms may present other problems. For example, rounding errors can be introduced, and for division operations, they provide no remainder. Furthermore, iterative algorithms still have performance limitations. Depending upon the precision required, the complete iterative process can take a considerable number of processor cycles. The corresponding delay may affect some procedures, particularly those involving multimedia presentations. Some multimedia extensions to processor architectures also specify reciprocal and reciprocal square root instructions that require increased (12-bit) precision. To generate 12 correct bits using conventional table lookup techniques requires a table of 2048 entries, which introduces more hardware costs.

Another alternative involves the use of a linear approximation as described in U.S. Pat. No. 5,563,818. However, these implementations require large lookup tables and larger multipliers than the implementation that will be described. A system that performs a quadratic approximation is shown in U.S. Pat. No. 5,245,564. This technique is an extension of linear approximation, providing three times the precision of a table lookup for the same number of words at the cost of an additional multiply and add, but accordingly requiring a longer execution time. U.S. Pat. No. 6,240,338 describes another alternative that uses a memory containing estimated reciprocal terms and a second memory containing reciprocal error terms.

Many conventional systems include retrieval of the inverse by table look-up including enhancement by obtaining bits by gating. These methods lack true or direct computing of the quotient of the division calculating. Instead of performing a direct computation of the quotient, they use large amounts of storage and addressing for looking up the different values to determine the quotient. They do not offer advantages from algorithms and other computational benefits. Other processes have obtained the reciprocal with some enhancement or decrease in table size, but still using normalization, de-normalization, shifts and other steps with clocks or iterative techniques that must be integrated into the overhead of the application.

As such, there is a need for improved methods and apparatus for rapidly calculating quotients and for rapidly calculating reciprocals with a high degree of accuracy. Furthermore, there is a need for methods and apparatus that can perform such calculations without the need for iteration steps, (i.e., trial and error), as well as without the need for clocks or similar mechanisms used in typical computing devices. Still further, there is a need for efficient processors for performing these calculations so that the semiconductor real estate required for the apparatus is less than or equal to that for the standard technology.

SUMMARY OF THE INVENTION

As set forth below, the apparatus, methods, and computer program products of the present invention overcome many of the deficiencies identified with determining quotients and reciprocals. In particular, the present invention provides apparatus, methods, and computer program products that determine the quotient of two numbers or a reciprocal of a number at a high rate and with a high degree of accuracy.

One embodiment of the present invention is a method of computing a reciprocal of a number M. The method includes the steps of separating M into at least two numbers X, Y . . . Z so that $M=X+Y+ \ldots +Z$; and using a non-iterative information processor to compute the reciprocal of M according to either an equation $1/M=F(X,Y \ldots Z)$ where F is a function or an approximation $1/M \approx G(X,Y \ldots Z)$, where G is a function and the approximation gives the correct value of the inverse of M to a predetermined accuracy.

Optionally, the method may include the step of obtaining parts of the equation or approximation from a table containing pre-calculated parts of the equation or pre-calculated parts of the approximation of the equation so as to facilitate computing the reciprocal of M.

Another embodiment of the present invention includes a method of computing a quotient of a divisor and a dividend directly as a function in a non-iterative process. The method of this embodiment includes calculating a reciprocal of the divisor directly as a function in a non-iterative process and calculating the quotient by multiplying the reciprocal by the dividend.

Another embodiment of the present invention includes a method of computing a quotient having predetermined accuracy for a dividend and a divisor; the method includes the step of non iteratively calculating bits of the quotient using gates.

Another embodiment of the present invention includes apparatus for computing a quotient having predetermined accuracy for a dividend and a divisor; the apparatus having logic components for non-iteratively calculating the bits of the quotient. In a further embodiment, the apparatus performs the calculations without using a timing mechanism such as clock; in other words, the apparatus operates unclocked.

Another embodiment of the present invention includes apparatus for computing a reciprocal of a number. The apparatus is capable of calculating the reciprocal using an equation that exactly describes the reciprocal. Optionally, the apparatus may include one or more read only memories for storing lookup tables containing pre-calculated parts of the equation.

DETAILED DESCRIPTION OF THE INVENTION

Figure 1:
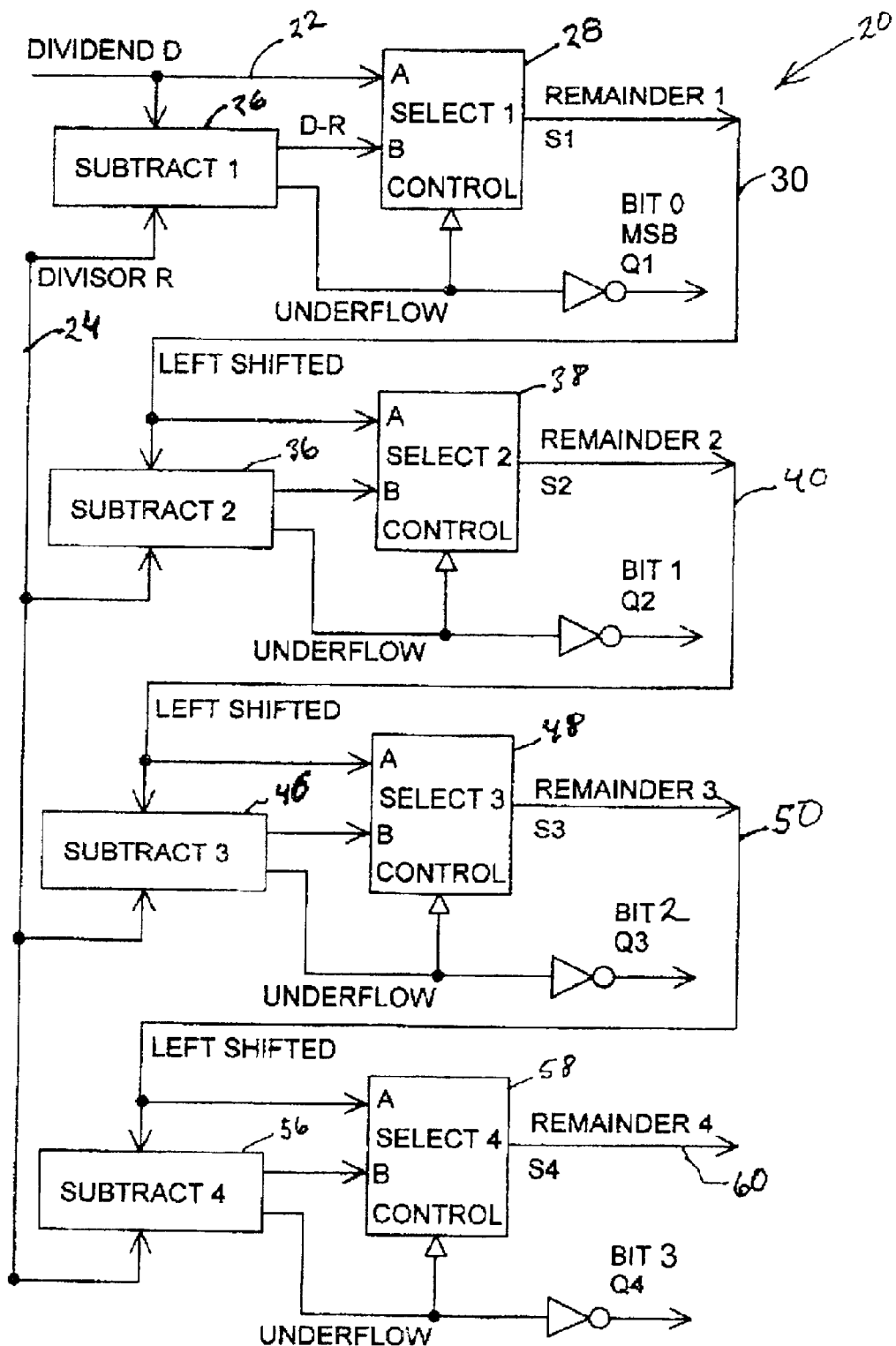
FIG. 1 is a diagram of an electronic apparatus for directly computing the division of a divisor into a dividend to output bits of a quotient according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, data processing systems have been developed for determining the quotient of two numbers and for determining the reciprocal of a number. However, because many of these systems are based on iterative techniques, (i.e., trial and error calculations), or other inefficient techniques, these systems are complex, slow, and inaccurate.

The present invention, on the other hand, provides apparatus, methods, and computer program products that can provide the quotient of two numbers or can provide the reciprocals for a number so that the quotient or reciprocal is available rapidly and with a high degree of accuracy. Specifically, the apparatus, methods, and computer program products of the present invention in one embodiment directly divide two numbers to obtain the quotient. The apparatus, methods, and computer program products of the present invention also may provide a reciprocal of a number by separating the number into a number represented by the most significant bits and a number represented by the least significant bits. The apparatus, methods, and computer program products of this embodiment, use a look-up table to obtain a pre-calculated reciprocal of the number represented by the most significant bits and correct the number from the lookup table using algebraic equations that incorporate the number represented by the least significant bits. In some embodiments, the correction is achieved by subtracting a correction factor from the pre-calculated reciprocal. In other embodiments, the correction is achieved by multiplying the pre-calculated reciprocal by a correction factor.

Division Direct

As discussed, in one embodiment, the apparatus, methods, and computer program products of the present invention provide for direct division of two numbers to obtain the quotient. These embodiments of the present invention use a logic network that determines the quotient in a non-iterative and typically an unclocked manner, such that the quotient is determined without trial and error and without delays associated with clocking.

In the following discussion, the operations are restricted to values that are represented in binary and are left justified so that the left-most position is occupied by a "one." This is a typical format for representation of numbers in a computing system, however, it is understood that any number format could be used. The numbers are represented in binary and the sign is not part of the operation that will be addressed. It will be assumed that resolving the sign and the exponent are matters that are known to those of ordinary skill in the art.

In deciding how many times a number adds to become equal to another number the process is open-ended. That is to say that the integer portion of the answer is not sufficient. In fact, with the method discussed herein is not even known where the integer portion ends. Such information is derived from the exponent portion.

It is accepted that as the number of binary places increases the accuracy improves. This is a worst-case point. If the number is exactly expressed by a small number of bits, there will be no gain from more bits. For a function such as division, it is necessary to achieve a minimum number of bits of accuracy to be useful. The purpose of this discussion is to provide a scheme that will provide a known number of bits of accuracy and a high speed of execution.

For this discussion, the binary point will be placed before the first bit. The smallest number possible is, of course zero. If the number is non-zero the smallest left-justified value is one-half (0.10000000000 . . . ). The largest number is one (0.11111111111 . . . ). This is the definition of the number system for the divisor and the dividend. The quotient will be permitted to have a one in front of the binary point as it is being developed and normalization will occur later. The word length is fixed, but may be any arbitrary finite integer M.

There are three special cases where computation of the quotient is not required. Specifically, if the divisor is zero and the dividend is non-zero, then the quotient is infinity, (i.e., $Q=D/R=D/0=\infty$). If both inputs are zero, the error handler sets the rules, and it is not a matter for the division algorithm to dictate. If only the dividend is zero, the answer is zero in any current mathematics, (i.e., $Q=D/R=0/R=0$).

It is worth noting that after accounting for the three cases mentioned above, all other answers will necessarily fall into the range from one-half (0.1000000000 . . . ) to two (1.1111111111 . . . ) until the exponent updates.

The calculation process of the present invention introduced here can implement the complete quotient for a dividend D and a divisor R to a high precision in a couple of layers of logic. The development process is one in which the complete logic of a divider is developed as gates only. This is achieved by completing the necessary functions in a division sequence. The calculation process presented herein is stated in terms of logical components that are actually groupings of gates. The structure can equivalently be expressed in mathematical equations or any other set of descriptors without changing the function being expressed. Once the system of equations is formed, the rules of Boolean algebra permit them to be manipulated into various forms. It is possible to solve each output bit as a two-logic-level equation and implement it as two gate delays. In the practical implementation with buffers and some tradeoffs, it may be built in five to ten gate delays.

Importantly, in one embodiment, the apparatus and methods of the present invention are implemented in a logic network designed to determine the quotient of a divisor and dividend without using an iterative process, (i.e., not using a trial and error process). The computing process is described in general terms below using structural components that are familiar to anyone of ordinary skill in the art. Terms such as 'Subtractors' actually refer to adders with the necessary dedication of gates to generate the two's complement of one of the inputs and add it to the other input. An embodiment of the process will now be demonstrated using the following logical groups and/or components: 1) subtractors for reducing a number by the amount of a second number and for indicating underflow; 2) shifters for performing left-shift of a number by techniques such as fixed wiring or other commonly available techniques and thus multiplying the number by two; 3) selectors for outputting one of the input numbers determined by input; and 4) buses or other interconnections for transferring data.

It must be understood that the embodiment of the logical network described below is only one example of the implementation of the apparatus, method, and computer program products of the present invention. There are a number of implementations that could be used, as long as they are designed to determine the quotient using a non-iterative method.

Reference is now made to FIG. 1 for the following operational steps for performing division according to one embodiment of the present invention. FIG. 1 shows a block diagram of an apparatus 20 for calculating a quotient for a dividend D and divisor R. The apparatus includes at least computing stage having at least one subtractor, at least one selector, and least one bus. The number of stages is dependent upon on the desired accuracy that is to be achieved.

The steps outlined below are for obtaining a quotient for a dividend D and divisor R and illustrate the design and use of the logic network. Specifically, first the dividend is applied on bus 22 and the divisor is applied on bus 24 so that the dividend provides input to a subtractor 26 and a selector 28, and so that the divisor provides input to subtractor 26. Subtractor 26 is connected to selector 28. Subtractor 26 calculates the difference between the dividend and the divisor and determines the underflow. Selector 28 receives the difference and the underflow from subtractor 26 as input. Bus 30 is connected with selector 28 so that output from selector 28 is fed to bus 30. If $D \geq R$ is true then selector 28 will place D−R on bus 30 and a "1" in the Quotient MSB else place D on bus 30 and a "0" in the Quotient MSB. Output data from selector 28 is applied to bus 30 is left shifted, which essentially multiples the value on bus 30 by two (2).

Techniques for left shifting data on a bus are well known in the art. A suitable technique for left shifting the data is accomplished by using fixed wiring; other standard left shifting techniques may also be used.

A second stage including a second subtractor 36 and a second selector 38 receive the left shifted data from bus 30. Subtractor 36 also receives an input of the divisor from bus 24. Subtractor 36 calculates the difference between the left shifted data from bus 30 and the divisor from bus 24 and an underflow for the difference. The difference and underflow from subtractor 36 are provided as input to selector 38. Bus 40 is connected with selector 38 to receive output from selector 38. If the left shifted data from bus $30 \geq R$ is true, then selector 38 will place left shifted data from bus 30−R on bus 40 and a "1" in Quotient MSB 1 else place left shifted data from bus 30 on bus 40 and a "0" in Quotient MSB 1.

A third stage including a third subtractor 46 and a third selector 48 are connected with bus 40 so as to receive data from bus 40 that has been left shifted. Subtractor 46 is also connected with bus 24 to receive an input of the divisor. Subtractor 46 determines the difference between the left shifted data received from bus 40 and the divisor and determines the underflow for the difference. Subtractor 46 is connected with selector 48 so that the difference and the underflow from subtractor 46 are provided as input to selector 48. A bus 50 is connected with selector 48 so as to receive output from selector 48. If the left shifted data from bus $40 \geq R$ is true then selector 48 will place S2−B in S3 and a "1" in Quotient MSB 2 else place left shifted data from bus 40 on bus 50 and a "0" in Quotient MSB 2.

Apparatus 20 also includes a fourth stage having a fourth subtractor 56 and a fourth selector 58 and another bus 60. The operation of the subtractor 56, selector 58, and bus 60 are substantially the same as that for the previously described subtractors, selectors, and buses in apparatus 20. Specifically, subtractor 50, selector 58, and bus 60 operate to provide a fourth data bit for the quotient that is being calculated. Although not shown in FIG. 1, apparatus 20 may also include still more stages of subtractors, selectors, and buses for providing still more data bits for the quotient. The additional stages would operate in substantially the same way as the previously described subtractors, selectors, and buses of apparatus 20.

It can be seen that the logic will proceed from the application of the dividend and divisor to the outputs without need of clocks or similar devices. In other words, embodiments of the present invention can be implemented using simpler hardware components than are typically required for the standard technology. This capability is a particularly valuable advantage offered by embodiments of the present invention. Further, because the logic network does not use a trial and error method of determining the quotient, the logic network is more a flow through device.

The logic used in embodiments of the present invention seems to represent a large number of gates in a row. It is possible to derive the equation for each output bit and reduce them to an equivalent form with an arbitrary maximum number of gate delays. As the maximum number of gate delays is reduced, the logic requires more gates, but the operation becomes faster.

In alternative embodiments, registers may be added for added features such as the capability of pipelining. The Shift registers may function as wired offsets in a continuing sequence of logic flow. However, it is to be understood that the registers are not required for implementing the invention.

As illustrated, the apparatus and method of the present invention computes a quotient having h-bit accuracy for a dividend and a divisor, where h is a preselected positive integer >2. The processing is non-iterative and uses a non-iterative logic network, where each stage generates a significant bit of the quotient and each successive stage generates the next lesser significant bit. To provide a better understanding of the apparatus of FIG. 1, illustrated below is described the division of 9 by 2.

Specifically, when received, the values are binary and are left justified so that the left-most position is occupied by a "one." They also include an exponent field. Specifically, the dividend D (9) is 1001 in binary, which is left justified and has an exponent of three (3) and the divisor R (2) is 0010 in binary, which when left justified is 1000 and has an exponent of one (1). With regard to FIG. 1, the two values are applied to the subtractor 26, which generates a value of 0001, (1001−1000). Since D≧R, (1001≧1000), the selector 28 will place D−R, (0001), on the bus 30 and a "1" in the Quotient MSB. The D−R is then left shifted to 0010. A the second stage, the left shifted D−R and R applied. However, because left shifted D−R (0010) is less than R (1000), then the second selector 38 sets the next bit of the quotient to "0" and passes left shifted D−R (0010) on bus 40, where it is left shifted again to 0100.

At stage three, the twice left shifted D−R (0100) is compared to R (1000) and is still less than R. The third selector sets the next most significant bit to "0" and passes 0100 on bus 50, where it is left shifted a third time to 1000. At the fourth stage, thrice left shifted D−R is greater than or equal to R. As such, the fourth subtractor 56 subtracts the numbers and has a result of zero and the fourth selector 58 outputs a next most significant bit for the quotient of "1."

The quotient has the following bits 1001. However, as discussed above, when the divisor and dividend are originally received, they are left justified and have a decimal in front of them. The decimal needs to be properly placed in the quotient, which is currently in front of the quotient (0.1001). As illustrated above, the dividend D (9) left justified is 1001 with an exponent of three (3) and the divisor R (2) left justified as 1000 binary an has an exponent of one (1). Subtracting the exponents leaves two (2), but since the exponents began at zero (0), (i.e., $2^0$), then the decimal point should be moved three places to provide a value of 100.1 binary for the quotient, which is equal to 4.5 decimal.

As illustrated, the apparatus, methods, and computer program products of this embodiment of the present invention provide division calculations that are non-iterative, (i.e., not trial and error), do not require clocking, and do not require table look up for computation of the quotient. As such, the apparatus, methods, and computer program products of this embodiment of the present invention provides a direct computation of the quotient to a divisor and a dividend.

Division by Rapid Generation of Reciprocal

As indicated earlier, division direct described above can be used to calculate the quotient of a dividend and a divisor. Another alternative for using division direct is to calculate the quotient for a dividend equal to one. In other words, determining the reciprocal for the divisor (1/R). After determining the reciprocal, it is then possible to carry out division by multiplying the reciprocal by a dividend (Q=(1/R)(D) to calculate the quotient for the dividend and the divisor.

Embodiments of the present invention include two methods for implementing the reciprocal, or inverse, of a given number. These methods are well suited to applications in coprocessors, CPU's or as stand-alone applications. The approach, referred to as the "bifurcation procedure," is based on a general equation that may be implemented in any of several ways. Both methods use the same equation and each applies a different algorithm. There are many slight variations of these algorithms that could be used, of which three variants are explained.

The two methods both use a reference value that is the inverse of a part of the number to be inverted. This reference number may be thought of as a "neighbor" of the final inverse to be found. The first method is one of subtracting a computed correction from this reference value to produce the required inverse. The second method multiplies a computed correction times the reference value to produce the inverse. The third method includes a multiplication and a subtraction to correct the reference value. The reciprocal (1/R), found by whatever method, may then be multiplied by the dividend (D) to produce the quotient, thus implementing the division operation. Any of the above processes may be used to produce a unit capable of high-speed, highly accurate algebraic division.

It is sometimes efficient to use an approximation of the applicable equation as is shown in the first example. Alternatively, the actual exact equation may be used as shown in the second example. An invariant function is exploited in the second example to allow pre-computation of the correction using the ratio of the two parts as the address for the pre-computed multiplier stored in a ROM look-up table.

I. The Bifurcation Technique Using Subtraction of an Offset

This process involves bifurcating, or separating, the number into two parts, as detailed below. These parts are then processed according to an equation that produces the reciprocal of the original number (the sum of the two parts) to the required accuracy. For the example, let M be a thirty-two-bit number for which we wish to determine the reciprocal. Let X be its 21 most significant bits and let A be its 11 least significant bits. This assures that X is at least 2,097,152 times larger than A (M is assumed to be left-justified.)

In order to present details of the process, it is useful to present the basic equation:

$$1/M = 1/(X+A) = 1/X - A/(X^2 + AX)$$

where M=X+A

The equation is exact and capable of yielding the precise value of the inverse of the number M. However, the equation is computationally complex. For purposes of implementation in hardware, it is useful to exploit a difference in scale between the two parts into which the number M is separated.

Although the equation is exact, it is somewhat computationally intensive. For this reason, an approximation to the algorithm utilized in the bifurcation technique may be derived as follows:

$$1/M = 1/(X+A)$$

$$1/M \approx (X-A)/X^2$$

for A<<X

The idea being employed is that although the two equations are algebraically different they are numerically identical within a certain accuracy. However, the approximation equation is much more computational friendly because the values of $X^2$ can be prestored in a table and multiplied by X−A to arrive at 1/M. For example, if M is 10, then X could be 9 and A would be 1. In this instance, $1/M = 1/(9+1) = 0.1$ exact, which is approximately $1/M \approx (X-A)/X^2 = (9-1)/9^2 = 0.0987654$. This approximation is computationally close to the exact value, but is computationally easier to calculate.

It is important to note that the accuracy of the approximation is selectable. Specifically, the accuracy can be improved by making the number of MSB bits of the number M assigned to X a larger number and thereby assigning a less number of bits to A. This makes the approximation portion of the equation a smaller factor. However, this has to be balanced in situations in which values of X are stored, because the more bits contained in X, the larger number of possible values of X that must be stored.

The actual mathematical approximation used in this embodiment is:

$$1/(X+A) \sim = (X-A)/X^2$$

for $A << X$

A closer approximation could be used, such as:

$$1/(X+A) \sim = ((X-A)^2 + AX)/X^3$$

While this would demonstrate higher accuracy, there are many similar equations that could be selected and the one chosen here is but one example. The example uses a single table with as many entries as the number of values possible for X. It is a list of the values of $1/X^2$ for each of the $2^{21}$ possible values of the 21-bit number X.

The choice of using a table is one of convenience for this example; other implementations are possible, such as using only logic gates. The use of explicit algebraic functions is also convenient. It is possible to develop the table, the gating, or the schematic of the example in other ways using development models such as neural networks, fuzzy logic, and the genetic algorithm. Development models such as neural networks, fuzzy logic, and the genetic algorithm are well known in the art.

The algorithm may be utilized to generate the reciprocal of the number with a high degree of accuracy. The examples presented here assume a process of bifurcating the given number by first left justifying the number so that the most significant bit is a one. If the given number contains no ones, it is zero and the inverse is infinite in which case the problem may be passed to an error handler. The given number is then broken into two parts, with the more significant part (MSP) containing the high-order bits (for example, 21 bits of a 32-bit number may be used) and the less significant part (LSP) having N leading zeros and the rest of the bits of the original number (the low-order bits). Between the MSP and LSP, a ratio of two million is directly achievable. The total of the MSP and the LSP is exactly the original number. This process assures that the ratio of the MSP to the LSP is great enough to provide the desired accuracy. Using the above algorithm and assigning the value of the MSP to X and the value of the LSP to A, it is possible to generate the inverse of the entire number to any desired accuracy. The inaccuracy is due to the approximation used but can be small enough to provide all significant bits correctly.

For a simpler implementation in hardware, A is subtracted from X so that the algorithm described above requires only one table look-up function. In other words, the value of $1/X^2$ is obtained from the table. A single multiplication then yields the value of $(X-A)/X^2$, providing the value of $1/M$ to the desired accuracy. All components of the inverse generator are able to function in a non-iterative process.

The advantage of this technique is that only about two million values of X need to be stored (if X is a 21-bit number). The inverse of all of the four billion, thirty-two bit numbers may be inverted by this process to within an accuracy of better than 32 bits. The process may be operated very fast. The structure is compatible with pipeline methods.

The algorithm may be embodied in more than one form, meaning that it may be implemented in hardware using somewhat different structures. However, it should be noted that all of the described variants, as well as all conjectural variants, are derived to provide the mathematical inverse to the specified accuracy and are, therefore, equivalent. For instance, the algorithm described above may be permuted as:

$$1/M = 1/X - A/(X^*(X+A))$$

$$1/M = (X^2 - A^*X + A^2)/(X^3 + A^3) - (A^3)/(X^{3*}(X+A))$$

$$1/M \sim = (X^2 - A(X-A))/X^3$$

for $A << X$

Those of ordinary skill in the art will understand that there are many ways to form a suitable approximation. For the example just given, the approximation includes replacing the term $1/(X+A)$ with $(X-A)/X^2$; this approximation is correct within one part in $2^{60}$. The final term in the second equation above is about $A^3/X^4$. Its value is less than $2^{-80}$, and therefore it may be ignored. Although this is approximate, it still gives accuracy of over sixty binary places.

The latter equation, however, differs in the sense of permitting a greater gain. It permits computing once again from $2^{21}$ stored values. In this case, however, $1/X^3$ may be used to derive the inverse of numbers to 80-bit accuracy. For this purpose, it is necessary that each stored inverse is accurate to about 88 bits.

The following is an embodiment of the present invention for obtaining the inverse of a number M using the exact equation, as opposed to the approximation. M is a 32-bit number, left justified with exponent field. X is the 16 most significant bits, and A is the 16 least significant bits. The method is carried out using a memory such as a read only memory, ROM(1), and another memory such as a read only memory, ROM(2). ROM(1) contains the inverse of each 16-bit number. ROM(2) contains the value of $A/(X^2+XA)$ for each 16-bit X/A. The relevant equations are as follows:

$$1/X^2 = (1/X)^2$$

The desired reciprocal is $1/M$ where $M = X+A$ so that $1/M = 1/(X+A)$.

$$1/X - 1/M = 1/X - 1/(X+A) = A/(X^2+XA)$$

$$1/M = 1/X - A/(X^2+XA)$$

$$1/M = 1/X - (1/X)(A/(X+A))$$

$$1/M = (1/X)(1 - A/(X+A))$$

$$(1 - A/(X+A)) = (X+A-A)/(X+A) = X/(X+A)$$

Thus:

$$1/M = (1/X)(1 - 1/(X+A)) = (1/X)(X/(X+A)) = 1/(X+A)$$

from the above:

$$1/M = 1/X - A/(X^2+XA)$$

$$A/(X+A) = 1/(X/A+1) = (A/X)/(1+A/X)$$

The function $A/(X^2+XA)$ may therefore be tabulated against X/A. If $1/X$ is tabulated to 16 bits, then X/A can be assumed to be $<1/65,384$. Therefore, by doing a 16-bit up-shift, a table of $1/X$ can be used to give $1/A$. After multiplying $1/A$ by X to get X/A, it is possible to use X/A to address another ROM containing $A/(X^2+XA)$ to get $A/(X^2+XA)$. The value of $1/M$ is obtained by subtracting $A/(X^2+XA)$ from $1/X$.

II. The Bifurcation Technique Using a Multiplication Factor

Another application of the algorithm using the bifurcation technique may be derived as follows:

$$1/M=1/(X+A)$$

$$1/M=1/X-A/(X^2+AX)$$

$$1/M=(1/X)*((1-A)/(A+X))=(1/X)*Z$$

for all values of A, X

Here the term begins with $1/X$ and it is multiplied by $(1-A/(A-X))$. A look-up table is addressed by the value of X and returns $1/X$. A is multiplied by the retrieved $1/X$ and the product $(A/X)$ is used to address a second ROM which is addressed by values of $A/X$ and provides:

$$Z=(1-A)/(A+X).$$

This procedure is made possible because the inverses of two numbers have a ratio that varies only with the ratio of the two numbers. This is quite clear when it is noted that the factor is the inverse of the ratio:

$$1/M=1(A+X)$$

$$1/M=(1/X)*(\text{RATIO}),$$

for which $$\text{RATIO}=X/M=X/(A+X),$$

and $$1/(A+X)=(1/X)*(X/(A+X)).$$

The process of finding the inverse of M includes the steps of: looking up in a ROM the value $1/X$ corresponding to the first 16 bits of M; multiplying this $1/X$ times A (the LSP of M) to get $A/X$; using the $A/X$ to address another ROM to get $Z=(1-A/(A-X))$; and multiplying Z times the $1/X$ to get $1/M$. This method uses the same equation as the earlier example, however, this method does not use an approximation. The main distinction is that in this case the inverse of the reference number is multiplied by a factor rather than subtracting a difference. An advantage is seen in that the two look-up tables can be smaller, such as 16 bits each (totaling 131,072 entries for both) as opposed to 21 bits (totaling 2,097,152 for one table) without sacrifice of accuracy.

An embodiment of the present invention is a method for the quick generation of a high precision inverse of a number M where M is a 32-bit number, left justified with exponent field. N is the 16 most significant bits, and $\delta$ is the 16 least significant bits. The method is carried out using a memory such as a read only memory, ROM(1), and another memory such as a read only memory, ROM(2). ROM(1) contains the inverse of each 16-bit number. ROM(2) contains the value of $1-\delta/(N-\delta)$ for each 16-bit $\delta/N$. The relevant equations are as follows:

$$M=N+\delta$$

$$1/M=1/(N+\delta)$$

$$1/M=1/N(1-\delta/(N+\delta))$$

The method includes the steps of: addressing ROM(1) with N to obtain $1/N$; multiplying $1/N$ by $\delta$ to get $\delta/N$; addressing ROM(2) with $\delta/N$ to obtain $1-\delta/(N+\delta)$; and multiplying $1/N$ by $(1-\delta)/(N+\delta)$ to get $1/M$. A limiting factor of this approach is the accuracy of the quantification of $(1-\delta)/(N+\delta)$.

The third method provides still higher accuracy for the calculated reciprocal. This method requires one more step than the previous embodiment. The following is an embodiment of this method for improved accuracy. M is a 32-bit number, left justified with exponent field. N is the 16 most significant bits, $\delta$ is the 16 least significant bits. The method is carried out using a memory such as a read only memory, ROM(1), and another memory such as a read only memory, ROM(2). ROM(1) contains the inverse of each 16-bit number. ROM(2) contains the value of $\delta/(N-\delta)$ for each 16-bit $\delta/N$. The relevant equations are as follows:

$$M=N+\delta$$

$$1/M=1/(N+\delta)$$

$$1/M=(1/N)((1-\delta)/(N+\delta))$$

$$1/M=1/N-\delta/(N(N+\delta))$$

$$1/M=1/N-(1/N)(\delta/(N+\delta))$$

The method includes the steps of: looking up $1/N$ in ROM(1) at address N; multiplying $\delta$ times $1/N$; looking up $\delta/(N+\delta)$ in ROM(2) at address $\delta/N$; multiplying $1/N$ times $\delta/(N+\delta)$; and subtracting $\delta/(N+\delta)$ from $1/N$ so as to obtain $1/M$.

Optionally, ROM(1) can assume a one in the MSB so that there are only $2^{15}$ entries. Correspondingly, ROM(2) has $2^{16}$ entries. Each entry could include 64 bits plus slope and curvature of $\delta/(N-\delta)$ and round up point of M.

Another advantage of this algorithm is that it can be easily pipelined using commonly known techniques.

Embodiments of the present invention that use the bifurcating methods, equations, and algorithms may be implemented in software, hardware, or combinations thereof.

Clearly, hardware embodiments of the present invention may have numerous configurations. Several example hardware configurations of embodiments of the present invention will now be presented. However, it is to be understood that embodiments the present invention are not limited to the examples presented here.

Figure 2:
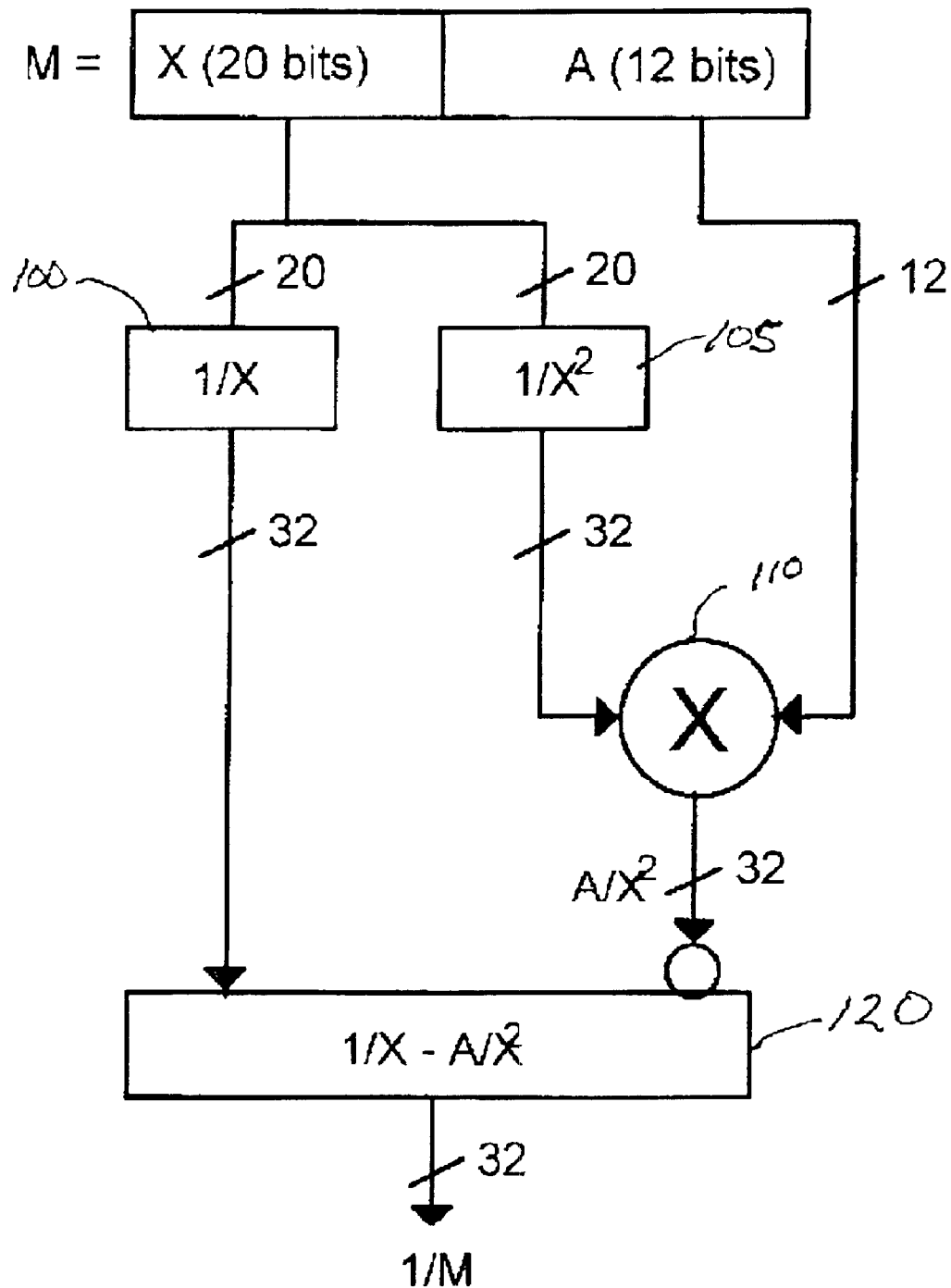
FIG. 2 is a diagram of an electronic apparatus for calculating the reciprocal for an input number to 32 bit accuracy according to one embodiment of the present invention.

Reference is now made to FIG. 2 wherein there is shown a block diagram for an embodiment of the present invention for calculating a reciprocal for a 32-bit number M. For this embodiment, the reciprocal, $1/M$, has an accuracy of 32 bits. The number M is separated into two numbers: X for the most significant 20 bits of M and A for the 12 less significant bits of M. This embodiment provides an approximate value for $1/M$ using an equation that approximates the reciprocal. The equation was derived as follows.

$$1/M=1/(X+A)=1/X-A/(X^2+AX)$$

If $A<<X$, then the following approximate equation results.

$$1/M \approx 1/X-A/X^2$$

This embodiment includes a first ROM 100 containing a lookup table of values of $1/X$, a second ROM 105 containing a lookup table of values of $1/X^2$, a multiplier 110, and a subtractor 120. The X is provided to ROM 100 and to ROM 105 so that ROM 100 outputs $1/X$ and ROM 105 outputs $1/X^2$. ROM 105 is connected to multiplier 110 to provide $1/X^2$ to multiplier 110. Multiplier 110 also receives as input the value of A so that multiplier 110 is capable of multiplying A by $1/X^2$ to obtain $A/X^2$. Multiplier 110 is connected to subtractor 120 to provide $A/X^2$ to subtractor 120. ROM 100 is connected with subtractor 120 so as to provide $1/X$ as input to subtractor 120. Subtractor 120 subtracts $A/X^2$ from $1/X$ to provide an approximate value of the reciprocal of M according to the equation developed above.

Figure 3:
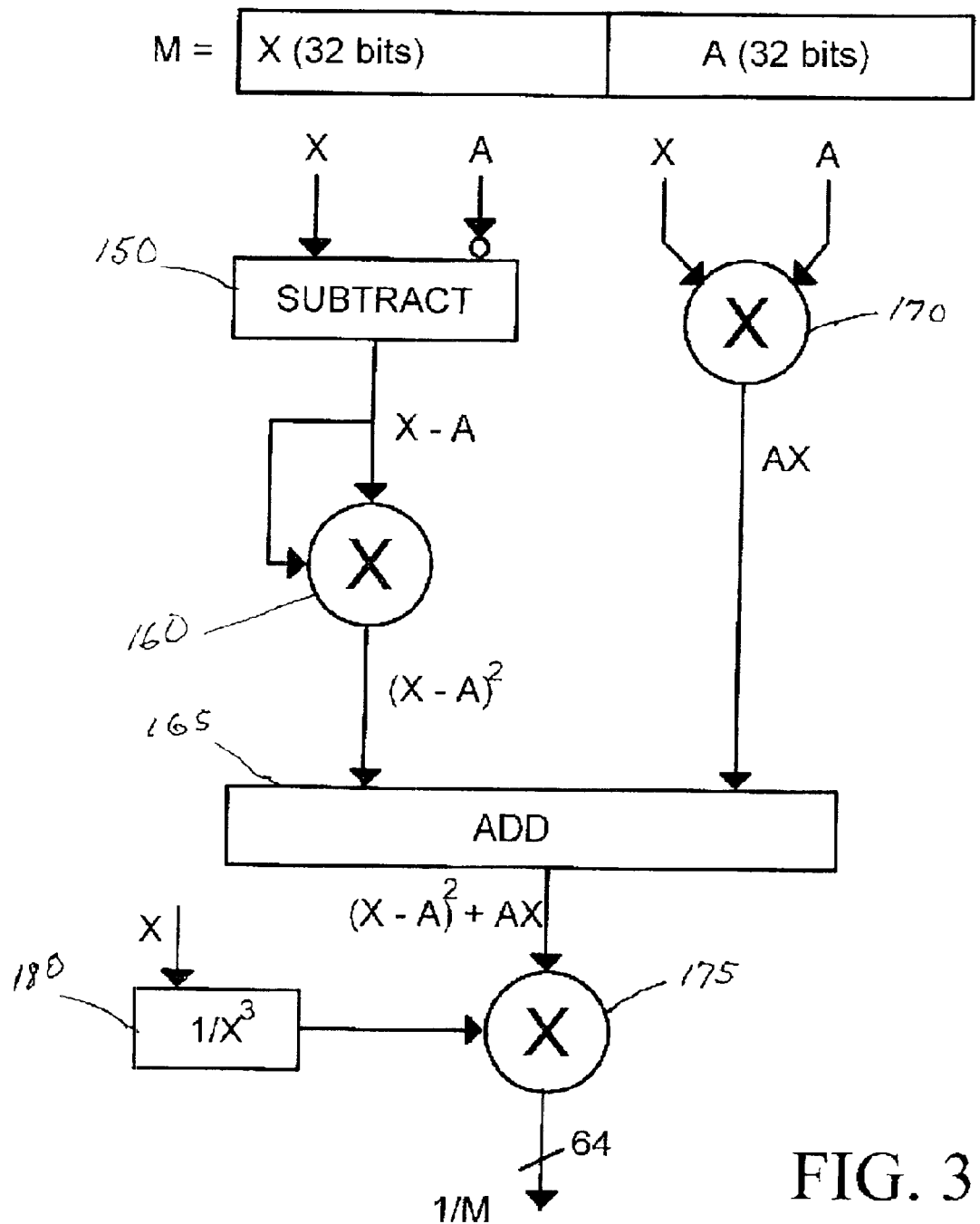
FIG. 3 is a diagram of an electronic apparatus for calculating the reciprocal for an input number to 64 bit accuracy according to one embodiment of the present invention.

Reference is now made to FIG. 3 wherein there is shown a block diagram for an embodiment of the present invention for calculating a reciprocal for a 64-bit number M. For this embodiment, the reciprocal, 1/M, has an accuracy of 64 bits. The number M is separated into two numbers: X for the most significant 32 bits of M and A for the 32 less significant bits of M. This embodiment provides an approximate value for 1/M using the following equation that approximates the reciprocal.

$$1/M \approx ((X-A)^2 + AX)/X^3$$

This embodiment uses a subtractor 150, a first multiplier 160, an adder 165, a second multiplier 170 a third multiplier 175 and a ROM 180. ROM 180 contains a lookup table for values of $1/X^3$. Subtractor 150 receives an input of values of X and A. Subtractor 150 subtracts X from A. Subtractor 150 is connected with multiplier 160 so that subtractor 150 can provide the subtraction results to multiplier 160. Multiplier 160 multiplies (X−A) by (X−A) to obtain $(X-A)^2$. Multiplier 160 is connected with adder 165 so that adder 165 receives an input of $(X-A)^2$ from multiplier 160. Second multiplier 170 receives an input of X and an input of A and generates the product AX. Multiplier 170 is connected with adder 165 so as to provide the product AX as input to adder 165. Adder 165 adds $(X-A)^2$ and AX to obtain $((X-A)^2+AX)$. Adder 165 is connected with multiplier 175 and provides the sum $((X-A)^2+AX)$ to multiplier 175. The value of X is provided to ROM 180 so that ROM 180 outputs the value of $1/X^3$. ROM 180 is connected with multiplier 175 so as to provide $1/X^3$ as input to multiplier 175. Multiplier 175 calculates the product of $1/X^3$ and $((X-A)^2+AX)$ and provides the product as outputs. The output from multiplier 175 approximately equals the reciprocal of M.

Figure 4:
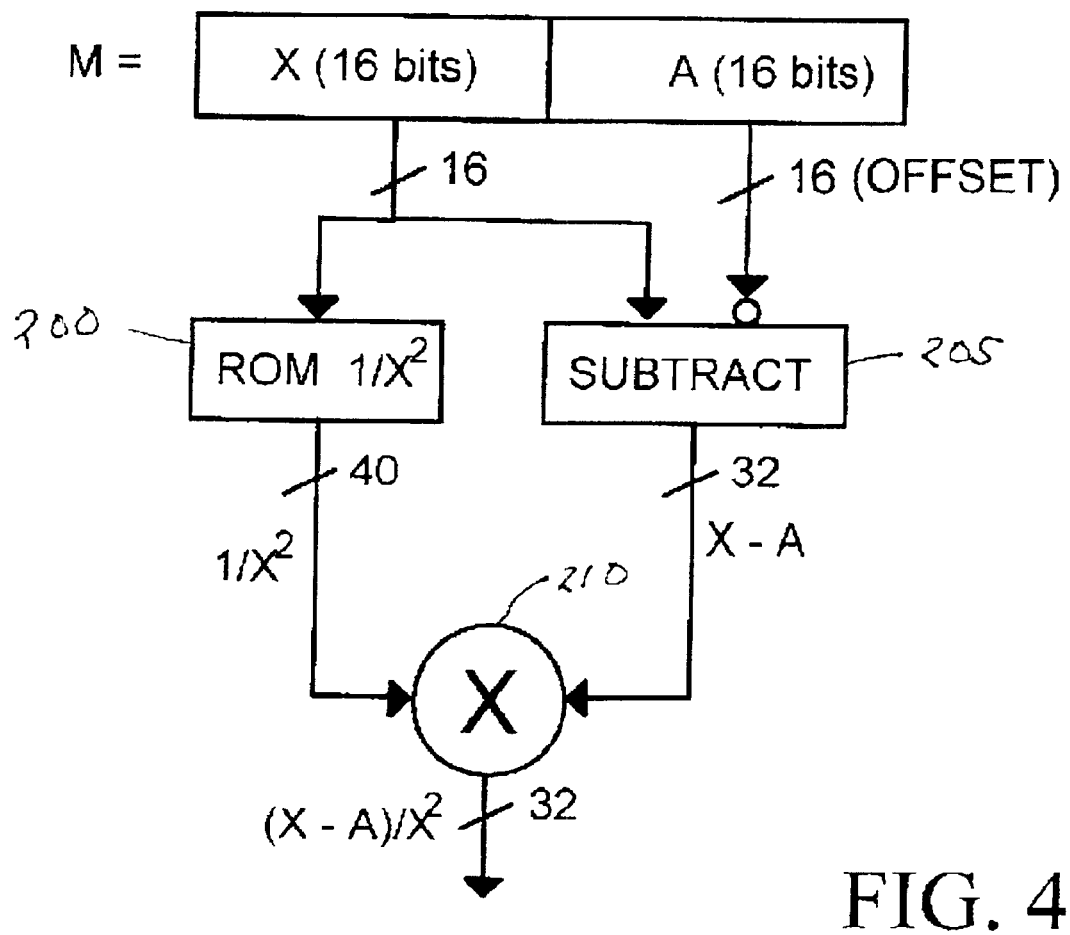
FIG. 4 is a diagram of an electronic apparatus for calculating the reciprocal for an input number to 32 bit accuracy according to one embodiment of the present invention.

Reference is now made to FIG. 4 wherein there is shown a block diagram for an embodiment of the present invention for calculating a reciprocal for a 32-bit number M. For this embodiment, the reciprocal, 1/M, has an accuracy of 32 bits. The number M is separated into two numbers: X for the most significant 16 bits of M and A for the 16 less significant bits of M. This embodiment provides an approximate value for 1/M using an equation that approximates the reciprocal. The equation was derived as follows.

$$1/M = 1/(X+A) = 1/X - A/(X^2 + AX)$$

$$1/M = 1/X - A/(X(X+A))$$

If A<<X, then the following approximate equation results.

$$1/M \approx 1/X - A/X^2 = (X-A)/X^2$$

This embodiment includes a ROM 200, a subtractor 205, and a multiplier 210. ROM 200 contains a lookup table of values of $1/X^2$. The value of X is provided to ROM 200 so that ROM 200 outputs $1/X^2$. ROM 200 is connected with multiplier 210 so as to provide $1/X^2$ to multiplier 210. Subtractor 205 receives input of X and A, and subtracts A from X to provide an output of X−A. Subtractor 205 is connected with multiplier 210 so that the output of subtractor 205 can be provided to multiplier 210. Multiplier 210 calculates the product of X−A and $1/X^2$ and outputs $(X-A)/X^2$ as a 32-bit approximate reciprocal of M.

Figure 5:
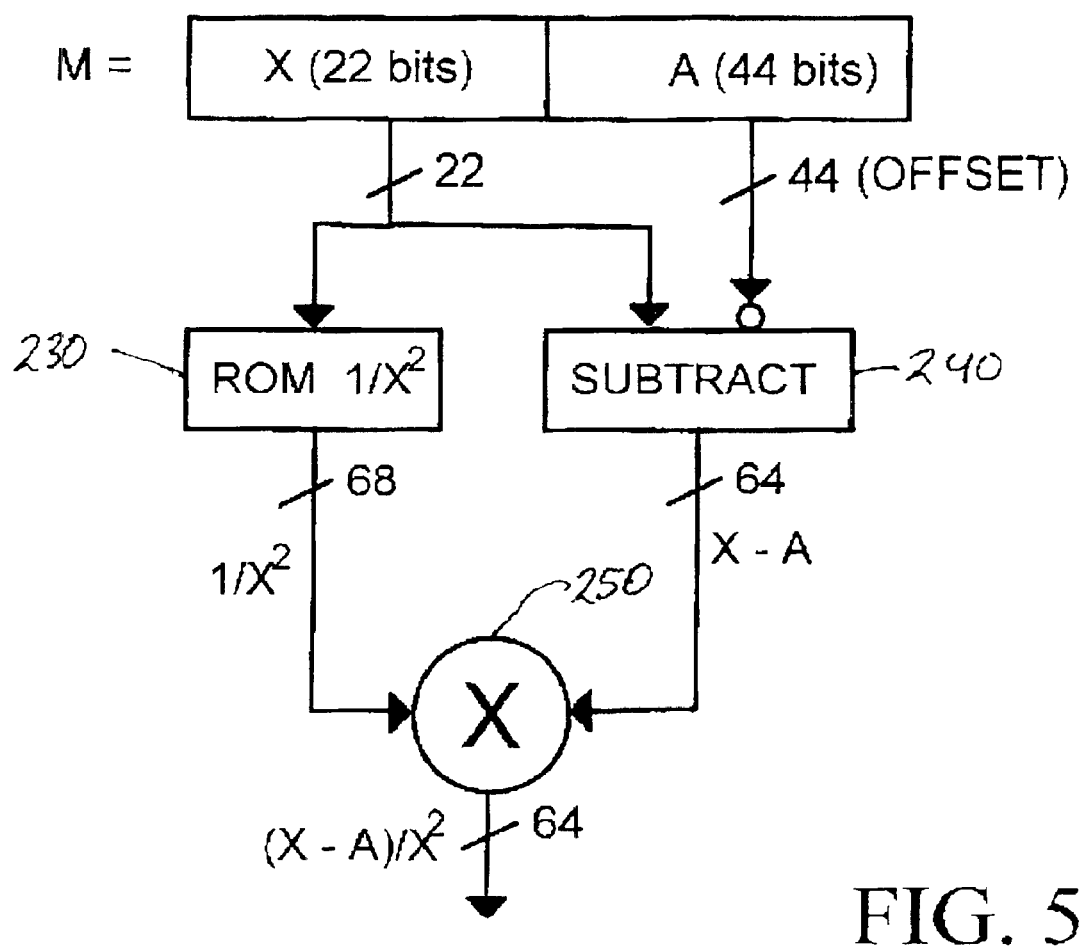
FIG. 5 is a diagram of an electronic apparatus for calculating the reciprocal for an input number to 64 bit accuracy according to one embodiment of the present invention.

Reference is now made to FIG. 5 wherein there is shown a block diagram for an embodiment of the present invention for calculating a reciprocal for a 64-bit number M. For this embodiment, the reciprocal, 1/M, has an accuracy of 64 bits. The number M is separated into two numbers: X for the most significant 22 bits of M and A for the 44 less significant bits of M. The embodiment shown in FIG. 5 uses substantially the same equations as those presented for the embodiment described in FIG. 4. This embodiment, referring to FIG. 5, includes a ROM 230, a subtractor 240, and multiplier 250, all connected essentially the same way as for the embodiment described for FIG. 4 with the exception that the connections are made to accommodate a 64-bit estimate of the reciprocal of M.

Figure 6:
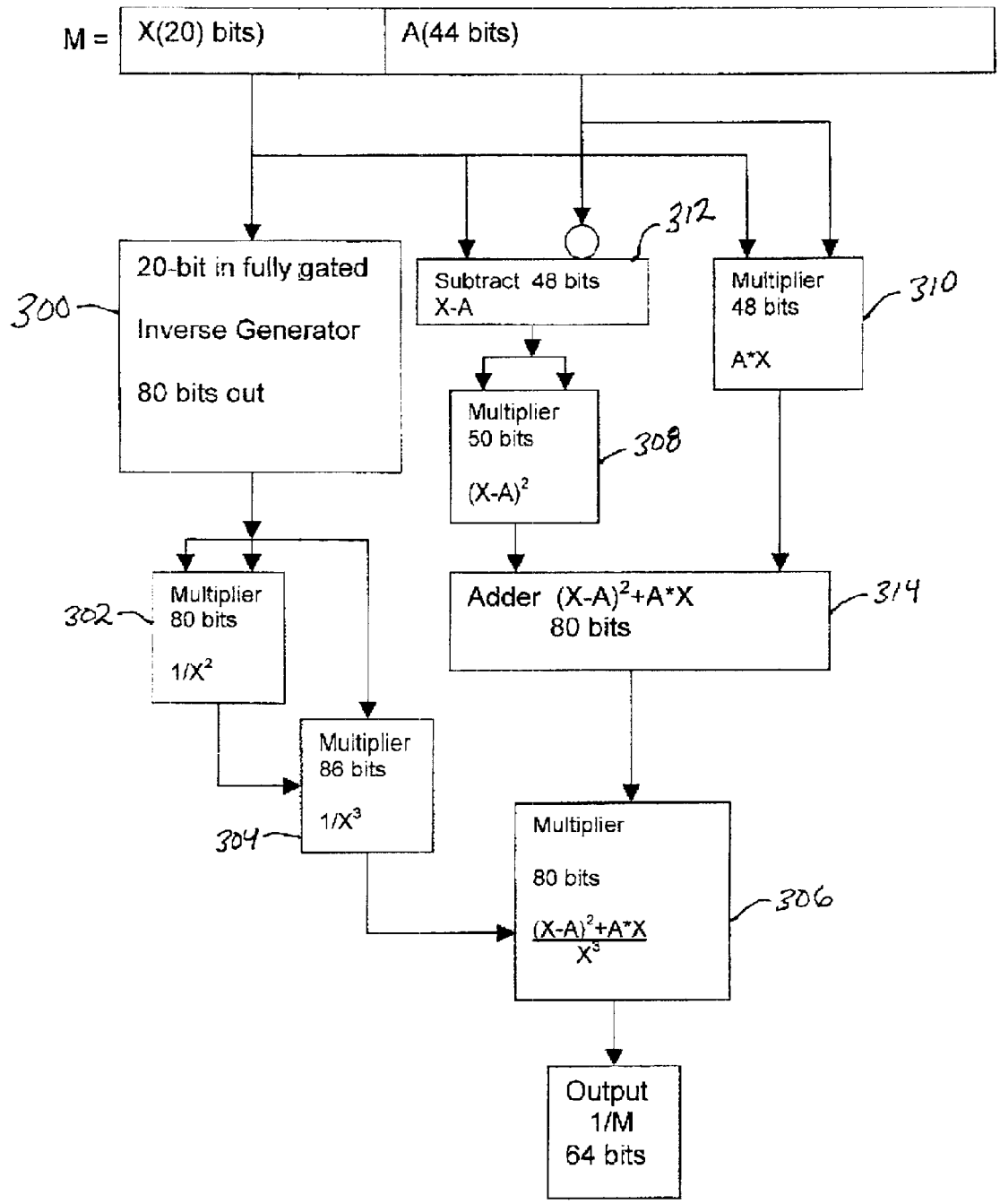
FIG. 6 is a diagram of an electronic apparatus for calculating the reciprocal for an input number to 64 bit accuracy according to one embodiment of the present invention.

Reference is now made to FIG. 6 wherein there is shown a block diagram for an embodiment of the present invention for calculating a reciprocal for a 64-bit number M. For this embodiment, the reciprocal, 1/M, has an accuracy of 64 bits. The number M is separated into two numbers: X for the most significant 20 bits of M and A for the 44 less significant bits of M. This embodiment provides an approximate value for 1/M using the following equation that approximates the reciprocal.

$$1/M \approx ((X-A)^2 + AX)/X^3$$

This embodiment uses a fully gated inverse generator 300. Generator 300 is capable of receiving a 20-bit input and providing an 80-bit output inverse of the input number. The operation of a suitable inverse generator that may be used for generator 300 is described for the embodiment described in FIG. 1. It is to be understood that the embodiment described in FIG. 1 is but one possible inverse generator configuration; other types of inverse generators may also be used for generator 300.

This embodiment also includes a first multiplier 302 a second multiplier 304, a third multiplier 306, a fourth multiplier 308, a fifth multiplier 310, a subtractor 312, and an adder 314. Generator 300 receives an input of X and outputs an 80 bit inverse of X. Generator 300 is connected with multiplier 302 so as to provide the inverse of X as input to multiplier 302. Multiplier 302 multiplies 1/X by 1/X to provide $1/X^2$ as an 80-bit output. Multiplier 302 is connected with multiplier 304 so that multiplier 302 can provide $1/X^2$ as an input to multiplier 304. Multiplier 304 is also connected with generator 300 so as to receive an input of 1/X from generator 300. Multiplier 304 calculates the 80-bit product of $1/X^2$ and 1/X to provide an output of $1/X^3$. Multiplier 304 is connected with multiplier 306 so as to provide $1/X^3$ as an input to multiplier 306.

Subtractor 312 receives inputs of X and A and provides a 48-bit output of X−A. Subtractor 312 is connected with multiplier 308 so as to allow multiplier 308 to multiply X−A by X−A to calculate an 80-bit product $(X-A)^2$. Multiplier 308 is connected with adder 314 so as to provide $(X-A)^2$ as an input to adder 314.

Multiplier 310 receives input of X and A, computes their product, and provides a 48-bit output of AX. Multiplier 310 is connected with adder 314 so as to provide the product AX as an input to adder 314. Adder 314 uses AX from multiplier 310 and uses $(X-A)^2$ from multiplier 308 to calculate the 80-bit sum $(X-A)^2 + AX$.

Multiplier 306 is connected with adder 314 so that the sum $(X-A)^2 + AX$ from adder 314 can be provided as input to multiplier 306. Multiplier 306 calculates the 80-bit product of $(X-A)^2 + AX$ and $1/X^3$ and provides the product as an output. The product output from multiplier 306 is the approximate reciprocal of M to an accuracy of 64 bits.

The embodiment of the present invention illustrated in FIG. 6 is notably different from the embodiments presented in FIGS. 2 through 5. Specifically, the embodiment presented in FIG. 6 does not require the use of a lookup table of pre-calculated values such as a ROM table. The embodiment in FIG. 6 performs all of the calculations as part of the process.

It is to be understood that embodiment of the present invention are not limited to the equations, method steps, circuit diagrams, and algorithms presented here. Other equations, method steps, circuit diagrams, and algorithms may be designed and implemented in embodiments of the present invention. As an example, a universal approximator maybe used to design alternative equations, method steps, circuit diagrams, and algorithms for embodiments of the present invention. A diversity universal approximators such as learning models and approximation modeling techniques are suitable. Examples of two kinds of modeling techniques are discussed. The first technique involves using specialized structures as universal functional approximators exemplified here by neural networks and fuzzy logic. The second technique involves using a general approximation (model identification) scheme, which works for any structure, and for which the pieces of the model are synthesized by a search technique, here exemplified by a Genetic Algorithm. A more detailed description of a genetic algorithm can be found in U.S. Pat. No. 4,935,877.

Examples of elementary blocks for the specialized structures are neurons for the neural approximators and fuzzy rules for the fuzzy systems approximators. For both types of approximators, universal functional approximation properties have been formally demonstrated. Fuzzy logic processors are known in the art and are commercially available. Fuzzy logic processors are available, as an example, in the form of computer executable code that can be run on computers or other electronic devices. Similarly, neural network processors are commercially available. Neural networks can be executed as software in the form of computer executable code. Furthermore, neural network chips are commercially available that can be used as neural network processors.

It is to be understood that different embodiments of the present invention can be combined so that they jointly calculate a quotient or jointly calculate a reciprocal. For example, if a quotient having an accuracy of a specified number of bits is to be calculated then one or more of the bits may be calculated by one embodiment of the present invention and one or more of the bits may be calculated by at least one different embodiment of the present invention so as to obtain the total number of bits for the quotient.

FIGS. 1–6 are block diagrams, and control flow illustrations of methods, systems, and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains, having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A logic network for computing the reciprocal of a number M in a non-iterative manner comprising logical devices configured to calculate an algebraic function that is a relationship of at least two numbers X and A that sum to equal the number M, wherein said logic network operates independent of a clock signal, wherein said logic network has logical devices configured to calculate the algebraic function:

$$1/M = 1/X - A/(X^2 + AX).$$

2. A logic network according to claim 1, wherein said logic network is derived by universal approximators.

3. A logic network according to claim 1, wherein said logic network includes storage devices for storing all possible values for at least some portions of the algebraic function, such that the stored values can be addressed and used in computing the reciprocal of the number M.

4. A logic network for computing the reciprocal of a number M in a non-iterative manner comprising logical devices configured to calculate an algebraic function that is a relationship of at least two numbers X and A that sum to equal the number M, wherein said logic network operates independent of a clock signal, wherein said logic network has logical devices configured to calculate the algebraic function that approximates the reciprocal of number M to a predetermined accuracy, said algebraic function being:

$$1/M \approx ((X-A)^2 + AX)/X^3$$

for A<X.

5. A method, of computing the reciprocal of a number M in a non-iterative manner comprising the steps of:

providing a logic network comprising logical devices for determining the reciprocal of number M, wherein the logical devices are configured to calculate an algebraic function that is a relationship of at least two numbers X and A that sum to equal the number M, wherein said logic network operates independent of a clock signal;

applying the number M to the logic network; and acquiring the reciprocal of the number M from an output of the logic network, wherein said providing step provides a logic network having logical devices configured to calculate the algebraic function:

$$1/M=1/X-A/(X^2+AX).$$

6. A method of computing the reciprocal of a number M in a non-iterative manner comprising the steps of:

providing a logic network that operates independent of a clock signal and comprising logical devices for determining the reciprocal of number M, wherein the logical devices are configured to calculate an algebraic function that is a relationship of at least two numbers X and A that sum to equal the number M, said algebraic function approximating the reciprocal of number M to a predetermined accuracy and being:

$$1/M=1/X-A/(X^2+AX)$$

simplified using the approximation $$1/(X+A) \approx (X-A)/X^2$$

for A<X;

applying the number M to the logic network; and acquiring the reciprocal of the number M from an output of the logic network.

7. A method according to claim 6 further comprising the step of multiplying the number M as a divisor to a dividend to determine a quotient.

8. A computer program product for computing a reciprocal of a number M, wherein the computer program product comprises:

a computer readable storage medium having computer readable program code means embodied in said medium, said computer-readable program code means comprising:

first computer instruction means for separating number M into at least two numbers X and A so that number M equals the sum of the at least two numbers X and A;

second computer instruction means for generating an algebraic function relating the at least two numbers X and A to the reciprocal of number M; and third computer instruction means for computing the reciprocal of number M according to the algebraic function, wherein said second computer instruction means generates the algebraic function of:

$$1/M=1/X-A/(X^2+AX).$$

9. A computer program product for computing a reciprocal of a number M, wherein the computer program product comprises:

a computer readable storage medium having computer readable program code means embodied in said medium, said computer-readable program code means comprising:

first computer instruction means for separating number M into at least two numbers X and A so that number M equals the sum of the at least two numbers X and A;

second computer instruction means for generating an algebraic function relating the at least two numbers X and A to the reciprocal of number M; and third computer instruction means for computing the reciprocal of number M according to the algebraic function, wherein said second computer instruction means generates the algebraic function that approximates the reciprocal of number M to a predetermined accuracy, wherein said second computer instruction means generates the algebraic function based on the requirement that one of the at least two numbers X and A, is much smaller than the other of the at least two numbers, said algebraic function being:

$$1/M=1/X-A/(X^2+AX)$$

simplified using the approximation $$1/M \approx ((X-A)^2+AX)/X^3$$

for A<X.

* * * * *

UNITED STATES PATENT AND TRADEMARK OFFICE
CERTIFICATE OF CORRECTION

PATENT NO. : 6,952,710 B2
DATED : October 4, 2005
INVENTOR(S) : Pelton et al.

It is certified that error appears in the above-identified patent and that said Letters Patent is hereby corrected as shown below:

Title page,
Item [*] Notice, cancel,
"This patent is subject to a terminal disclaimer.".

Signed and Sealed this

Thirty-first Day of January, 2006

JON W. DUDAS
*Director of the United States Patent and Trademark Office*